(12) United States Patent
Eronen et al.

(10) Patent No.: US 12,104,855 B2
(45) Date of Patent: Oct. 1, 2024

(54) SYSTEM AND A METHOD FOR STORING AND TRANSFERRING HEAT

(71) Applicant: Polar Night Energy Oy, Tampere (FI)

(72) Inventors: Tommi Eronen, Tampere (FI); Markku Ylönen, Tampere (FI)

(73) Assignee: Polar Night Energy Oy, Tampere (FI)

(*) Notice: Subject to any disclaimer, the term of this patent is extended or adjusted under 35 U.S.C. 154(b) by 377 days.

(21) Appl. No.: 17/434,473

(22) PCT Filed: Mar. 11, 2020

(86) PCT No.: PCT/FI2020/050152
§ 371 (c)(1),
(2) Date: Aug. 27, 2021

(87) PCT Pub. No.: WO2020/183063
PCT Pub. Date: Sep. 17, 2020

(65) Prior Publication Data
US 2022/0146205 A1    May 12, 2022

(30) Foreign Application Priority Data
Mar. 12, 2019  (FI) ...................................... 20195181

(51) Int. Cl.
*F28D 15/02*    (2006.01)
*F28D 20/00*    (2006.01)

(52) U.S. Cl.
CPC ..... *F28D 15/0275* (2013.01); *F28D 20/0056* (2013.01)

(58) Field of Classification Search
CPC .......................... F28D 15/0275; F28D 20/0056
See application file for complete search history.

(56) References Cited

U.S. PATENT DOCUMENTS

| 2008/0134681 A1 | 6/2008 | Nayef et al. |
| 2012/0111006 A1 | 5/2012 | Varga |
| | (Continued) | |

FOREIGN PATENT DOCUMENTS

| CN | 106767073 A | 5/2017 |
| CN | 108007246 A | 5/2018 |
| | (Continued) | |

OTHER PUBLICATIONS

Written Opinion of the International Search Authority, PCT/FI2020/050152, mailed May 29, 2020, 5 pages.
(Continued)

*Primary Examiner* — Elizabeth J Martin
(74) *Attorney, Agent, or Firm* — Thomas| Horstemeyer, LLP

(57) ABSTRACT

The invention relates to a system (100, 300, 400) for storing and transferring heat. The system (100, 300, 400) comprises at least one resistor (101, 301, 401) for producing heat energy from electrical energy, at least one heat storage module (102, 302, 402) comprising solid material for storing the heat energy produced, and a heat transfer mechanism (103, 303, 403) for transferring heat from the at least one heat storage module (102, 302, 402) into a heat transfer system (104, 304, 404). The heat transfer mechanism (103, 203, 403) is a closed gas loop or a thermosiphon system. The specification further relates to a method for storing and transferring heat.

12 Claims, 2 Drawing Sheets

(56) References Cited

U.S. PATENT DOCUMENTS

| | | | | |
|---|---|---|---|---|
| 2013/0047616 A1* | 2/2013 | Holmes | ............... | F24D 11/005 |
| | | | | 60/670 |
| 2015/0295508 A1* | 10/2015 | Conry | ............... | H02M 5/4585 |
| | | | | 363/37 |
| 2015/0308751 A1* | 10/2015 | Kim | ..................... | F24S 60/00 |
| | | | | 165/10 |
| 2018/0142577 A1 | 5/2018 | Ortmann et al. | | |
| 2018/0224215 A1 | 8/2018 | Theirs et al. | | |
| 2020/0232345 A1* | 7/2020 | Zwinkels | ................ | F01K 3/14 |

FOREIGN PATENT DOCUMENTS

| | | | |
|---|---|---|---|
| JP | H0229546 A | 1/1990 | |
| JP | H10002616 A | 1/1998 | |
| WO | 2012/169900 A1 | 12/2012 | |

OTHER PUBLICATIONS

International Search Report, PCT/FI2020/050152, mailed May 29, 2020, 4 pages.

\* cited by examiner

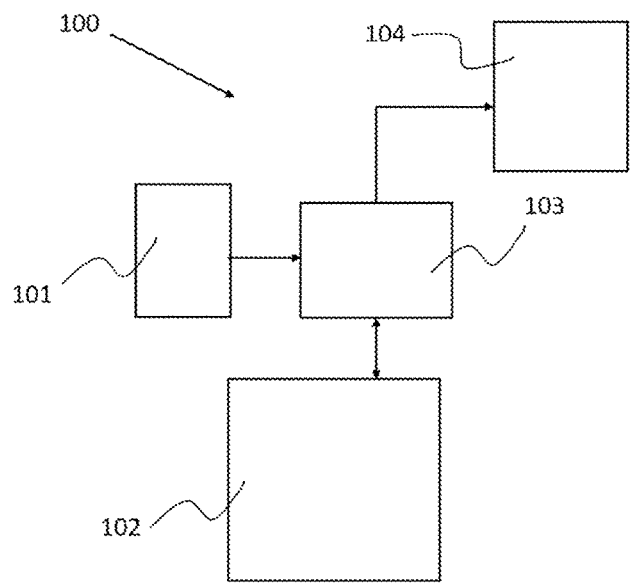
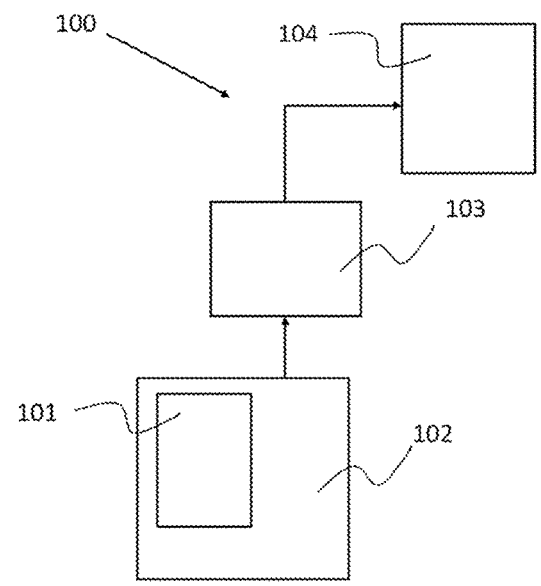
Fig. 1a          Fig. 1b
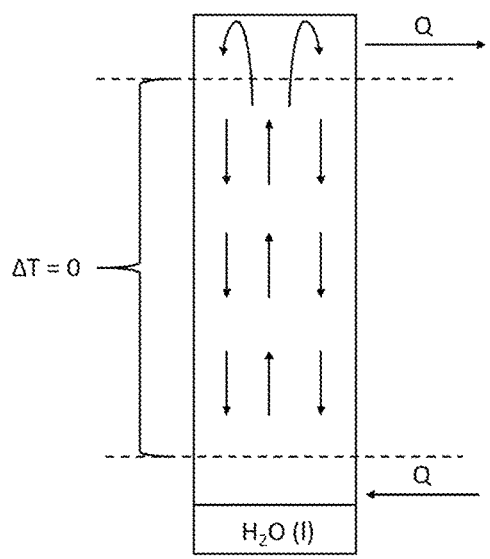
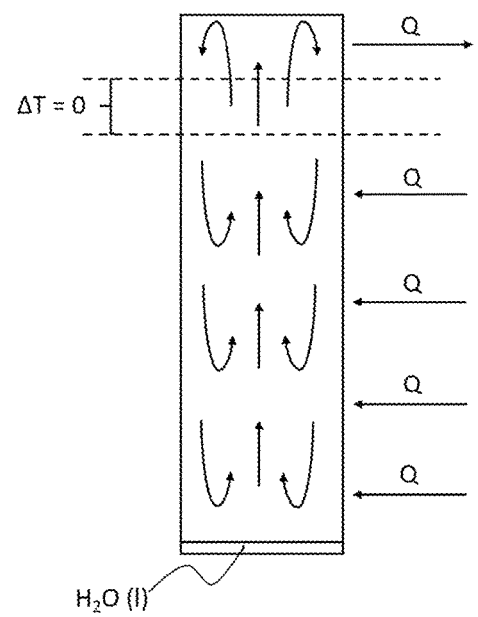
Fig. 2a (prior art)          Fig. 2b

SYSTEM AND A METHOD FOR STORING AND TRANSFERRING HEAT

CROSS-REFERENCE TO RELATED APPLICATIONS

This application claims priority to is the 35 U.S.C. § 371 national stage application of PCT Application No. PCT/FI2020/050152, filed Mar. 11, 2020, where the PCT claims priority to, and the benefit of, FINNISH application no. 20195181, filed Mar. 12, 2019, both of which are herein incorporated by reference in their entireties.

TECHNICAL FIELD

This specification relates to a system and a method for storing and transferring heat. In particular, the specification relates to a seasonal high-temperature heat storage.

BACKGROUND

Renewable energy sources, most notably solar and wind, provide highly fluctuating electric power. The fluctuating nature of the power causes difficulties in the power grid. The price per energy unit, however, is relatively low in modern plants. Therefore, various storage technologies, such as batteries, pump-turbine hydropower and compressed gas have been developed and used in storing the excess power produced. Heat storages, as well, have been developed, typically utilizing water-based seasonal heat storage. The storage temperature of heat storage utilizing water as the storage medium is, however, limited.

SUMMARY

It is an aim of this application to provide an inexpensive way to store energy into a useable form.

According to an embodiment, a system for storing and transferring heat is provided. The system comprises at least one resistor for producing heat energy from electrical energy, at least one heat storage module comprising solid material for storing the heat energy produced, and a heat transfer mechanism for transferring heat from the at least one heat storage module into a heat transfer system. The heat transfer mechanism is a closed gas loop or a thermosiphon system.

According to an embodiment, a method for storing and transferring heat is provided. The method comprises producing heat energy from electrical energy, storing the heat energy produced into at least one heat storage module comprising solid material, transferring the heat energy from the at least one heat storage module by a heat transfer mechanism into a heat transfer system, the heat transfer mechanism being a closed gas loop or a thermosiphon system.

Further embodiments are presented in the dependent claims.

BRIEF DESCRIPTION OF THE DRAWINGS

FIG. 1a illustrates, by way of an example, a system 100 according to an embodiment, FIG. 1b illustrates, by way of an example, a system 100 according to another embodiment, FIG. 2a illustrates, by way of an example, a conventional thermosiphon pipe, FIG. 2b illustrates, by way of an example, a thermosiphon pipe according to an embodiment.

Figure 3:
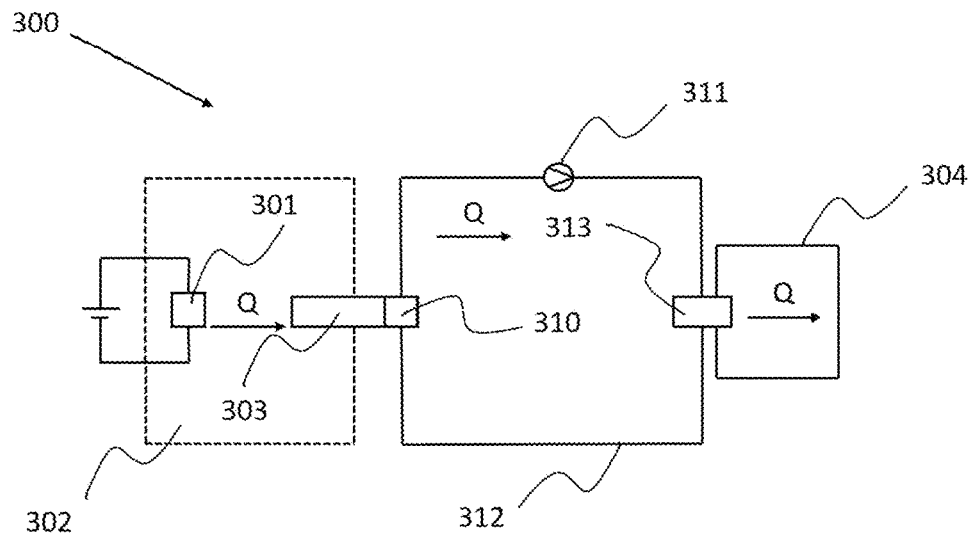
FIG. 3 illustrates, by way of an example, a process chart for a system 300 and a method according to an embodiment.

The figures are schematic. The figures are not in any particular scale.

DETAILED DESCRIPTION

The solution is described in the following in more detail with reference to some embodiments, which shall not be regarded as limiting.

The following reference numbers are used in this application:
100 system
101 resistor
102 heat storage module
103 heat transfer mechanism
104 heat transfer system
300 system
301 resistor
302 heat storage module
303 heat transfer mechanism
304 heat transfer system
310 heat exchanger
311 pump
312 secondary heat transfer loop
313 secondary heat storage module
400 system
401 resistor
402 heat storage module
403 heat transfer mechanism
404 heat transfer system
405 fan
410 heat exchanger
411 pump/fan
412 secondary heat transfer loop
413 secondary heat storage module The term "thermosiphon" refers to a method of passive heat exchange, based on natural convection, which circulates a fluid without the necessity of a mechanical pump.

A system 100 for storing and transferring heat is provided. The principal idea of the system 100 is illustrated in FIGS. 1a and 1b. The system 100 comprises at least one resistor 101 for producing heat energy from electrical energy, at least one heat storage module 102 comprising solid material for storing the heat energy produced, and a heat transfer mechanism 103 for transferring heat from the at least one heat storage module into a heat transfer system 104, the heat transfer mechanism 103 being a closed gas loop or a thermosiphon system.

The system 100 may further comprise an electrical energy producing unit. The electrical energy producing unit may be configured to produce electrical power from energy sources that have a fluctuating, non-controllable power output, such as solar energy or wind. The electrical energy producing unit may comprise at least one of the following: a solar panel, a wind turbine, wave power, over-capacity of any electricity grid.

The system 100 comprises at least one resistor 101. The resistor 101 is configured to produce heat energy from electrical energy. The resistor 101 may be configured to produce heat energy from the electrical energy produced by the electrical energy producing unit. The resistor 101 is a heater resistor of a conventional type. The resistor may be placed outside or inside a heat storage module 102, as illustrated in FIGS. 1a and 1b, respectively.

The system comprises at least one heat storage module 102. The heat storage module 102 is a seasonal heat storage. Seasonal heat storage is a storage for heat for periods up to several months. Heat energy may be stored into the storage whenever it is available and the stored heat energy may be used whenever needed. Typically, heat is stored during summertime and consumed during winter.

The heat storage module 102 is configured to store the heat energy produced by the resistor(s) 101. The heat storage module 102 comprises solid material for storing the heat energy produced. The solid material may be called storage medium. The solid material may be non-flammable and inert. The storage medium may comprise at least one of the following: sand, bedrock, gravel, or any material that is possible to heat up to at least 1200° C. temperature without significant chemical reactions or melting, or a mixture of any of these materials. In a case the storage medium comprises sand, it is preferable that the sand comprises only a minor amount of impurities, especially chlorine- or sulphur-based elements, in order to reduce possible corrosion effects.

Volume of the heat storage module 102 may be chosen on the grounds of the end use needs. The volume may be for example 100 m$^3$ or below. Shape of the heat storage module 102 may be close to a cube, a cylinder, a ball or any other shape with a sufficiently small surface to volume ratio. The heat storage module 102 may be surrounded by an insulating layer. The insulating layer may comprise for example expanded clay aggregate, such as LECA, or other similar non-burning material having low heat conductivity. Low heat conductivity is considered as lower than that of a typical dry sand (lower than 0.3 W/mK). The heat storage module 102 may be placed underground.

The heat storage module 102 may be configured to store heat energy up to a temperature of 1200° C. The preferred storage temperature of the heat storage module may be 200-700° C., most preferably between 300-500° C. The heat energy stored in the heat storage module 102 is produced by resistor(s) 101 placed in the heat storage module 102 or by hot gas produced by resistor(s) 101 placed elsewhere in the system.

The system comprises a heat transfer mechanism 103 that is configured to transfer heat from the heat storage module 102 into a heat transfer system 104 for further use. The heat transfer mechanism 103 is a closed gas loop or a thermosiphon system.

Thermosiphon System

According to an embodiment, the heat transfer mechanism 103 is a thermosiphon system. Thermosiphon system comprises a plurality of pipes that are closed from both ends. Water and water vapor are being sealed inside the pipes. The pipes may be placed to any angle between 45° and 90° (upright) with respect to the horizontal plane, namely the ground plane. This means that one end of the pipe is arranged on the bottom and the other end of the pipe is arranged on the top. The pipes may be for example up to 15 meters long. The length of a pipe may extend from the bottom of the heat storage module to about 1 m above the top of the heat storage module. The thermosiphon pipes may be made of stainless steel or any other suitable alloy composition. The stainless steel grade may be for example 304L, 304H, 316L, 316H, 321H or 330. The thermosiphon pipes may be arranged in an optimally spaced honeycomb mesh, or any other approximately equal spacing, determined by the limitations in installation procedure. The number of thermosiphon pipes may be from some tens to several thousands, depending on the volume of the heat storage module.

Thermosiphon pipes enable high heat transfer rates. An illustration of a conventional thermosiphon pipe is presented in FIG. 2a. When heated from the bottom, the water located at the bottom of the pipe vaporizes and travels upwards (arrows pointing up in FIG. 2a) to the top end of the pipe. The heat is extracted at the top end of the pipe, and subsequently the steam inside the pipe condenses and water returns to the bottom of the pipe due to the gravity (arrows pointing down in FIG. 2a). A conventional thermosiphon pipe is typically up to 1 m long and has an operation temperature up to 300° C. Conventional pipes always have water at the bottom of the pipe available for evaporation, and thus a drying-up condition is avoided. The upper temperature limit (300° C.) is due to critical point of water, which is reached as the pressure increases along with the temperature.

According to an embodiment, the thermosiphon system is configured to operate differently compared to the conventional system. This is illustrated by FIG. 2b. The amount of liquid, i.e. water, in each of the pipes may be arranged to be at most 25% of the volume of the pipe. This means that during operation, drying-up is allowed. The thermosiphon system is arranged to be operating outside the saturated vapor regime. After drying-up, the vapor superheats and its pressure and temperature increase. The pressure is, however, limited by design, through the amount of initial water.

The amount of initial water is calculated through the maximum allowed pressure inside the thermosiphon pipe. The amount of water is the thermosiphon pipe volume multiplied by the vapour density at the designed maximum pressure and temperature. For example, at 200 bar pressure and 500° C. temperature, the density is 67.60 kg/m$^3$. Therefore, for a thermosiphon pipe having a length of 10 meters and an internal diameter of 9 mm, the total volume would be 0.0006 m$^3$ and the amount of water to be filled would be 0.04 kg, or 40 ml at 20° C. temperature and atmospheric pressure. This kind of a setup has a 6.8% filling ratio. If the maximum temperature is lower, the filling ratio is higher, up to 25%.

The system may comprise a heat exchanger arranged at the thermosiphon upper ends. In that case, the thermosiphon pipes are from their upper ends connected to the heat exchanger. The heat exchanger may comprise thermally insulated tanks. The tanks may be made of stainless steel and each tank may have a volume of at most 1 m$^3$. When heat is not being actively transferred from the heat storage module, the thermosiphon upper ends are arranged to be in ambient pressure vapor, thus reducing the passive heat transfer from the heat storage module.

The heat exchanger arranged at the thermosiphon upper ends is an optional feature. Alternatively, the thermosiphon pipes may be directly connected to a secondary heat transfer loop.

The system may comprise a secondary heat transfer loop. The secondary heat transfer loop may comprise water or gas as transfer medium. The secondary heat transfer loop may be connected to the heat exchanger arranged at the thermosiphon upper ends or directly to the thermosiphon upper ends. The secondary heat transfer loop may be connected to the heat exchanger for example by insulated stainless steel pipes. The secondary heat transfer loop may comprise electronically operated valves before and after the heat exchanger. The valves are configured to be closed when heat is not being transferred from the heat storage module. The valves are configured to be at least partially open when the heat is being transferred from the heat storage module.

The system may comprise a secondary heat storage module. The secondary heat storage module may be a water tank. The secondary heat storage module may be configured to have a capacity to serve for a heating demand of 1-7 days. The secondary heat storage module may be directly connected to the secondary heat transfer loop. The secondary heat storage module may be connected to any kind of heat transfer system. The heat transfer system may be for example domestic heating system, domestic hot water system, hot air system or industrial heating system.

Closed Gas Loop

According to an embodiment, as an alternative to the thermosiphon system, the heat transfer mechanism 103 is a closed gas loop. In the closed gas loop, the heat storage module comprises stainless steel pipes arranged into the storage medium. The stainless steel pipes are arranged to transport high temperature gas when charging the heat storage module and gas of close to the storage medium temperature when transferring heat from the heat storage module. Preferably, the stainless steel pipes are arranged to travel vertically in the storage medium, but a horizontal or angled array is also possible. The gas is preferably inert gas, such as nitrogen. Pressure of the closed gas loop may vary for example from ambient pressure up to 50 bar. Pressurization may be utilized to increase the heat transfer rate without increasing the gas velocity excessively.

The closed gas loop may be fan-driven. A fan may be provided for moving the gas in the closed gas loop. Velocity of the gas flow may be adjusted by the fan. The natural convection arising from the heat storage module heat-up and cool down may suffice at certain conditions, but sometimes use of the fan is needed. The fan may be a two-directional fan. The fan may be capable of withstanding temperatures up to 1200° C. Preferably, motor of the fan is placed outside the closed gas loop. The motor of the fan is preferably stored at room temperature or at a temperature slightly higher.

In a system 100 wherein the heat transfer mechanism 103 is a closed gas loop, the at least one resistor 101, that is configured to produce heat energy from the electrical energy, is arranged to be part of the closed gas loop, as illustrated in FIG. 1a. The at least one resistor 101 is arranged to heat the gas of the closed gas loop. The heat from the closed gas loop is arranged to be stored into the at least one heat storage module 102. The at least one resistor 101 may be a conventional high-temperature resistor. The resistor may be arranged inside an insulated tank.

The closed gas loop may comprise a heat exchanger. The heat exchanger may be a conventional gas-to-water or gas-to-gas heat exchanger. The heat exchanger may be a counter-current heat exchanger. The heat exchanger may be capable of withstanding temperatures up to 1200° C. The heat exchanger may be arranged to transfer heat from the closed gas loop to a secondary heat transfer loop.

The system may comprise a secondary heat transfer loop. The secondary heat transfer loop may comprise water or gas as transfer medium. The secondary heat transfer loop may be connected to the heat exchanger. The secondary heat transfer loop may be connected to the heat exchanger for example by insulated stainless steel pipes. The secondary heat transfer loop may comprise electronically operated valves before and after the heat exchanger. The valves are configured to be closed when heat is not being transferred from the heat storage module. The valves are configured to be at least partially open when the heat is being transferred from the heat storage module.

Whereupon a closed gas loop is utilized as the heat transfer mechanism, the secondary heat storage module is an optional feature. Size of the secondary heat storage module may be anything between a few minutes capacity to more than one week capacity, depending on the application. If the heat exchanger is efficient enough, the secondary heat storage module is not necessary. However, if a secondary heat storage module is utilized, it may be connected to the system in such a way that the liquid of the secondary heat storage module is arranged to circulate through the heat exchanger and back to the secondary heat storage module, thus capturing heat from the gas loop. The heat exchanger may also be arranged so that the inert gas acting as heat transfer medium travels through the secondary heat storage module inside piping, finned or non-finned. Essentially, the gas loop may travel through the secondary heat storage module, thus heating the liquid inside.

The closed gas loop may further comprise a gas intake valve and a pressure sensor. The gas intake valve may be a unidirectional valve. The gas intake valve may be arranged to fill and pressurize the closed gas loop. The pressure sensor is arranged to monitor the pressure level of the closed gas loop in order to detect for example possible leaks.

The maximum pressure in the gas loop may be controlled using a unidirectional spring valve that lets the pressure drop inside the gas loop by letting the gas out. This may be required to control the maximum pressure in the loop. When the loop reaches its maximum temperature, this valve lets out all the required gas, and no further gas is let out in subsequent heating cycles.

Method for Storing and Transferring Heat

A method for storing and transferring heat is provided. In the method heat energy is produced from electrical energy. The heat energy produced is stored into at least one heat storage module comprising solid material. The heat energy is transferred from the at least one heat storage module by a heat transfer mechanism into a heat transfer system. The heat transfer mechanism is a closed gas loop or a thermosiphon system, as presented above.

FIG. 3 illustrates a process chart for a system 300 according to an embodiment utilizing the thermosiphon system as the heat transfer mechanism 303. Heat is produced by at least one resistor 301 placed inside at least one heat storage module 302. The at least one resistor 301 may be buried into the storage medium. The heat produced by the at least one resistor 301 is stored into the storage medium. Whereupon there is a demand for the heat, the thermosiphon system is activated. The thermosiphon system is activated by opening the valves of a heat exchanger 310 arranged at the thermosiphon upper ends. The heat exchanger 310 begins to cool the upper ends of the thermosiphon pipes and a vapor-liquid cycle starts to operate. Thus, heat is transferred from the heat storage module 302 via the thermosiphon pipe(s).

The heat may be transferred via a secondary heat transfer loop 312 to a secondary heat storage module 313. The secondary heat transfer loop 312 may comprise a pump 311 for circulating the liquid or gas inside the secondary heat transfer loop 312. From the secondary heat storage module 313 the heat may be taken to its end use by a heat transfer system 304 relating to any conventional heating system, hot water system, hot air system or industrial system. In FIG. 3 the arrow marked with Q above it refers to direction of the heat transfer, i.e. from the heat storage module 302 to the heat transfer mechanism 303, from the heat exchanger 310 to the secondary heat storage module 313 and from thereon to the heat transfer system 304.

According to an embodiment, the pipes of the thermosiphon system are configured to operate outside their conventional range. The thermosiphon pipes are filled with the liquid to a lesser extent than in the conventional use, as illustrated by FIGS. 2a and 2b. The amount of liquid, i.e. water, in each of the pipes may be arranged to be at most 25% of the volume of the pipe. After a certain temperature limit, this leads to a dry-up condition, wherein the state of the steam contained by the pipe(s) is transformed from saturate to supersaturate. The optimal heat flux is obtained when the thermosiphon pipe is operated at the saturated state. In the system and method according to this disclosure, the saturated state is locally reached automatically when moving from no-load to load condition.

No-load condition is the condition wherein there is no voluntary heat transfer from the heat storage module. In the no-load condition, the vapour inside the thermosiphon pipes reaches the storage medium temperature and therefore its maximum pressure. The load condition is defined as any condition wherein there is any voluntary heat transfer from the heat storage medium for example to the secondary heat storage module, i.e. there is a liquid flow arranged through the upper ends of the thermosiphons. As the liquid flow cools down the upper ends of the thermosiphons, the vapour begins to condensate and the vapour state moves towards saturated state from superheated state. The vapour state may be superheated in the lower parts of the thermosiphons, but the saturated state is reached in the upper ends automatically, if there is sufficient heat transfer from the thermosiphons to the circulated liquid.

In use, a length of the thermosiphon pipe may be divided into an evaporator section, an isothermal section and a condenser section. The evaporator section is that part of the thermosiphon pipe that is responsible for taking in the heat energy (illustrated in FIGS. 2a and 2b as arrows marked with Q above and pointing towards the thermosiphon pipe). Evaporation of the liquid inside the pipe into steam takes place in the evaporator section. Isothermal section refers to a section, wherein the temperature remains constant. This refers to a section marked with ΔT=0 in FIGS. 2a and 2b. The condenser section is responsible for giving off the heat forwards from the thermosiphon pipe (illustrated in FIGS. 2a and 2b as arrows marked with Q above and pointing away from the thermosiphon pipe).

The purpose of a conventional thermosiphon is to transport heat over a distance. Therefore, a relatively long isothermal section is usually required in conventional thermosiphon pipes. In the thermosiphon pipes according to this disclosure, the isothermal section, i.e. the isothermal distance, of the thermosiphon pipe(s) is minimized. This is possible, because the only purpose of the isothermal section is to thermally isolate the storage from the ambient, through the primary storage insulation layer. The total length of the thermosiphon pipe is increased when compared to conventional thermosiphons, but most of the length increment comes from the length of the evaporator section. The evaporator section is overly sufficient when the heat storage module is fully charged, so secondary evaporation processes take place. This means that condensed water never meets the bottom of the thermosiphon, so the effective length of the thermosiphon is shorter than the actual length. This has the effect that the heat transfer rate may be increased during a period of higher heat demand, such as during winter time.

The evaporation of all of the liquid water inside a thermosiphon pipe when the temperature exceeds a certain limit leads to superheating of the steam. When there is a load introduced, the superheated steam drops back to the saturated level in the condenser section of the thermosiphon pipe and the secondary evaporation processes take place.

Figure 4:
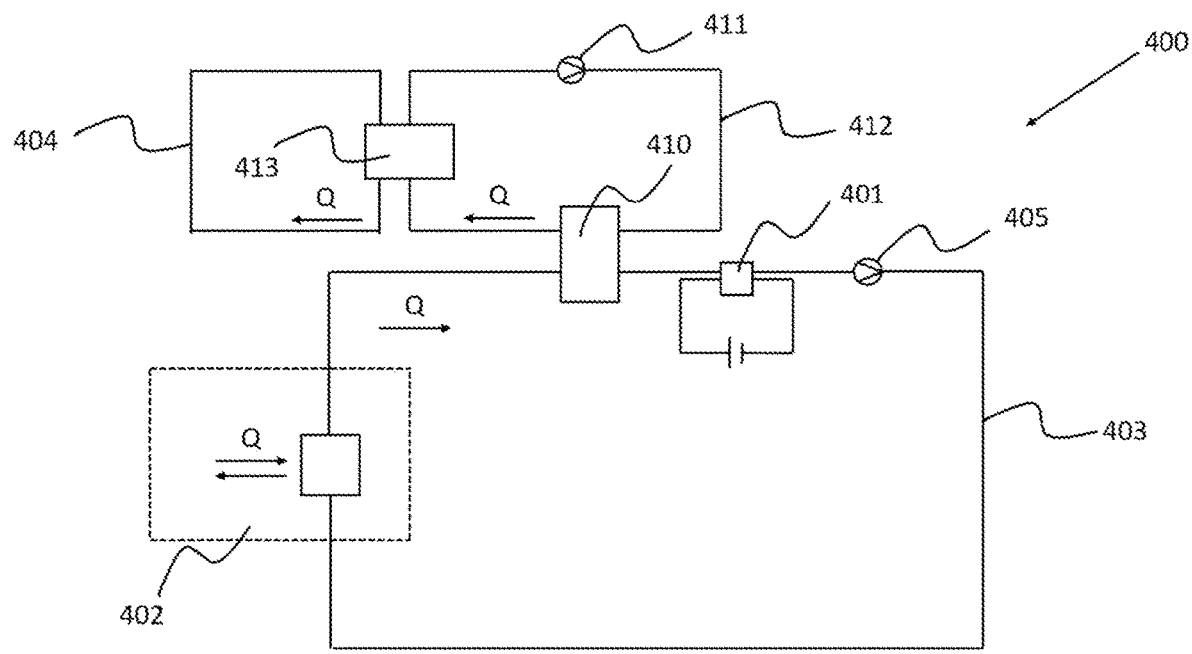
FIG. 4 illustrates, by way of an example, a process chart for a system 400 and a method according to an embodiment.

FIG. 4 illustrates a process chart for a system 400 according to an embodiment utilizing the closed gas loop as the heat transfer mechanism 403. Heat is produced by at least one resistor 401 that is arranged to be part of the closed gas loop. The closed gas loop transfers the heat to and from the heat storage module 402. In FIG. 4 this is illustrated by a two-directional arrow with Q above. Whereupon there is excess power available, the inert gas contained by the closed gas loop is heated up with the at least one resistor 401 that is arranged to be part of the closed gas loop. The heat from the closed gas loop is stored into the at least one heat storage module 402.

Whereupon a demand for heat is confronted, the gas contained by the closed gas loop is heated by the heat storage module 402 and the gas is moved forward to a heat exchanger 410. The heat exchanger 410 may be a gas-to-water or gas-to-gas heat exchanger that is configured to take the heat of the gas and transfer it to the water or gas. From the heat exchanger 410, the heat may be transferred via a secondary heat transfer loop 412 to a secondary heat storage module 413. The secondary heat transfer loop 412 may comprise a pump/fan 411 for circulating the water/gas inside the secondary heat transfer loop 412.

The heat exchange process may also be arranged so that the closed gas loop pipes travel through the secondary heat storage module 413, thus heating the liquid inside the secondary heat storage module 413. The secondary heat storage module 413 may also be totally excluded, if the heat exchanger 410 is arranged so that it is sufficiently efficient for the application.

The direction of propagation of the gas contained by the closed gas loop may be controlled by a fan 405. The fan 405 may be a two-directional fan. Whereupon there is no end use heat demand, the heat exchanger 410 or the secondary heat storage module 413 is bypassed and the fan 405 pushes the gas to the resistor(s) 401 that heat the gas up. The gas temperature may be up to 2000° C., preferably between 700-1000° C. The hot gas proceeds through the heat storage module 402, thus cooling down and the heat energy is stored in the storage medium. The gas temperature in the heat storage module 402 is always higher than the temperature of the storage medium, allowing heat transfer to the storage. The gas temperature is slightly above the storage temperature at the storage exit. The gas proceeds in top-to-bottom direction through the heat storage module 402, which promotes natural convection and thus reduces the needed fan power.

Whereupon there exists end use heat demand, the resistor(s) 401 generate no heat. The fan 405 pushes the gas in bottom-to-top direction. The gas is heated in the pipes passing through the heat storage module 402. The temperature of the gas when exiting the heat storage module 402 may be close to the overall heat storage temperature, i.e. up to 1200° C. The gas flow is regulated in such a way that the temperature at the storage exit is close to the storage temperature. The heated gas is passed into a heat exchanger 410 or directly to the secondary heat storage module 413, wherein the gas is cooled. The heat may be transferred from the heat exchanger 410 to a secondary heat transfer loop 412. The gas exits the heat exchanger 410 at a temperature close to the secondary heat transfer loop minimum temperature, which is typically between 40 and 70° C. After the heat exchanger 410 or the secondary heat storage module 413, the gas returns to the fan 405.

The system and method according to this disclosure allows the heat being transferred from the heat storage in a dynamic manner. This means that the heat may be transferred only on demand. The solid material as the heat storage medium allows the heat energy to be stored up to a temperature of 1200° C. Compared to systems utilizing liquid, such as water, as the storage medium a benefit is obtained by the remarkably higher storage temperature as well as inhibition of the possible hazards caused by the pressure rise when the storage temperature rises.

An exemplary building may have annual heat energy consumption of 20 000 kWh. The building may be provided with solar panels for example for 100 kW, which may in typical Finnish climate conditions produce 77 000 kWh energy annually. Without a decent means for storing the energy produced by the solar panels, the building may obtain approximately 6000 kWh (8%) of the produced energy to its own use. With a system and/or method for storing and transferring heat according to this disclosure, a 100% energy self-sufficiency with respect to heat energy may be obtained. The system and the method according to this disclosure thus provide an inexpensive way to store energy into a useable form.

The system is effectively a combination of an electricity generating system, with the surplus electricity turned into heat. This surplus is stored in an inexpensive medium, with a sufficient efficiency ratio for the investment being lucrative. The stored energy may be utilized dynamically and at will, during times of less input from the energy source than the required electricity and heating demand. The system is safe by design, as there are no toxic or hazardous materials used, and no risk of uncontrollably increasing pressure.

The invention claimed is:

1. A system for storing and transferring heat, comprising
at least one resistor for producing heat energy from electrical energy,
at least one heat storage module comprising solid material for storing the heat energy produced, and
a heat transfer mechanism for transferring heat from the at least one heat storage module into a heat transfer system, the heat transfer mechanism being
a fan-driven closed gas loop, wherein the at least one heat storage module comprises pipes arranged into the solid material, the pipes being arranged to transport a gas in the pipes, and the closed gas loop transfers heat to and from the at least one heat storage module, or
a thermosiphon system comprising a plurality of pipes that are closed from both ends.

2. The system according to claim 1, further comprising a secondary heat transfer loop.

3. The system according to claim 1, further comprising a secondary heat storage module.

4. The system according to claim 1, further comprising an electrical energy producing unit, wherein the electrical energy producing unit is configured to produce energy from fluctuating energy sources or from over-capacity of an electricity grid.

5. The system according to claim 1, wherein the at least one heat storage module is configured to store heat energy up to a temperature of 1200° C.

6. The system according to claim 1, wherein the at least one heat storage module is placed underground.

7. The system according to claim 1, wherein the thermosiphon system comprises thermosiphon pipes that each are filled with a liquid, a volume of the liquid being at most 25% of a volume of the thermosiphon pipe.

8. A method for storing and transferring heat, comprising
producing heat energy from electrical energy,
storing the heat energy produced into at least one heat storage module comprising solid material,
transferring the heat energy from the at least one heat storage module by a heat transfer mechanism into a heat transfer system, the heat transfer mechanism being
a fan-driven closed gas loop, wherein the heat energy is stored into the at least one heat storage module via pipes arranged into the solid material, the pipes being arranged to transport a gas in the pipes, and the heat is transferred to and from the at least one heat storage module by the closed gas loop, or
a thermosiphon system comprising a plurality of pipes that are closed from both ends.

9. The method according to claim 8, further comprising transferring the heat energy via a secondary heat transfer loop into the heat transfer system.

10. The method according to claim 8, further comprising storing the heat energy into a secondary heat storage module prior to transferring the heat energy into the heat transfer system.

11. The method according to claim 8, further comprising producing the electrical energy from fluctuating energy sources or from over-capacity of an electricity grid.

12. The method according to claim 8, wherein the method comprises
transferring heat energy by the thermosiphon system, wherein the thermosiphon system comprises thermosiphon pipes that each are filled with a liquid, a volume of the liquid being at most 25% of a volume of the thermosiphon pipe.

* * * * *